United States Patent
Ludwig et al.

(10) Patent No.: US 7,260,946 B2
(45) Date of Patent: Aug. 28, 2007

(54) MOBILE REFRIGERATION SYSTEM AND CONTROL

(75) Inventors: Bradley M. Ludwig, Minnetonka, MN (US); Doug Lenz, Prior Lake, MN (US); Darrell Storlie, Clarks Grove, MN (US); Steve Helgeson, Lakeville, MN (US); Brian Meagher, Prior Lake, MN (US); Gary Connolly, Galway (IE)

(73) Assignee: Thermo King Corporation, Minneapolis, MN (US)

( * ) Notice: Subject to any disclaimer, the term of this patent is extended or adjusted under 35 U.S.C. 154(b) by 0 days.

(21) Appl. No.: 11/417,797

(22) Filed: May 4, 2006

(65) Prior Publication Data

US 2006/0196211 A1 Sep. 7, 2006

Related U.S. Application Data

(62) Division of application No. 10/930,635, filed on Aug. 31, 2004, now Pat. No. 7,080,521.

(51) Int. Cl.
*B60H 1/32* (2006.01)
(52) U.S. Cl. .................. 62/115; 62/208; 62/228.4; 62/323.4
(58) Field of Classification Search ............ 62/115, 62/208–209, 228.4–228.5, 239, 323.4
See application file for complete search history.

(56) References Cited

U.S. PATENT DOCUMENTS

| | | | |
|---|---|---|---|
| RE30,499 E | 2/1981 | Moody, Jr. et al. | |
| 4,485,635 A | 12/1984 | Sakano | |
| 4,663,725 A | 5/1987 | Truckenbrod et al. | |
| 4,753,083 A | 6/1988 | Sato | |
| 4,986,084 A | 1/1991 | Beckhusen | |
| 5,228,301 A | 7/1993 | Sjoholm et al. | |
| 5,318,100 A | 6/1994 | Aoki | |
| 5,331,821 A | 7/1994 | Hanson et al. | |
| 5,408,836 A | 4/1995 | Sjoholm et al. | |
| 5,410,889 A | 5/1995 | Sjoholm et al. | |
| 5,465,586 A | 11/1995 | Sjoholm et al. | |
| 5,465,587 A | 11/1995 | Sjoholm et al. | |
| 5,477,695 A | 12/1995 | Sjoholm et al. | |
| 5,598,718 A | 2/1997 | Freund et al. | |
| 5,634,347 A | 6/1997 | Hanson et al. | |

(Continued)

OTHER PUBLICATIONS

Thermo King Corporation brochure on Model SB-210 Temperature Control Unit (TK 52031-2-PL) Dated Oct. 2003.

(Continued)

*Primary Examiner*—William E. Tapolcai
(74) *Attorney, Agent, or Firm*—Michael Best & Friedrich LLP

(57) ABSTRACT

A mobile refrigeration system that includes an engine that is operable at a first speed greater than zero and a second speed greater than zero. A compressor is operable in response to the engine at a first speed and a second speed. The system also includes an evaporator, a first temperature sensor positioned to measure a first temperature, and a second temperature sensor positioned to measure a second temperature. A controller is operable to transition the engine between the first speed and the second speed in response to the first temperature exceeding a first predetermined value and the second temperature falling below a second predetermined value.

17 Claims, 6 Drawing Sheets

U.S. PATENT DOCUMENTS

| | | | |
|---|---|---|---|
| 5,711,161 A | 1/1998 | Gustafson | |
| 5,884,494 A | 3/1999 | Okoren et al. | |
| 6,095,427 A | 8/2000 | Hoi um et al. | |
| 6,318,101 B1 | 11/2001 | Pham et al. | |
| 6,470,692 B1 | 10/2002 | Ziegler et al. | |
| 6,560,980 B2 | 5/2003 | Gustafson et al. | |
| 6,609,388 B1 | 8/2003 | Hanson | |
| 6,629,423 B1 | 10/2003 | Hirooka et al. | |
| 6,679,074 B2 | 1/2004 | Hanson | |
| 6,745,585 B2 | 6/2004 | Kelm et al. | |

OTHER PUBLICATIONS

Thermo King Corporation brochure on Model SB-310 Temperature Control Unit (TK 52032-2-PL) Dated Oct. 2003.

MOBILE REFRIGERATION SYSTEM AND CONTROL

RELATED APPLICATIONS

This application is a divisional of U.S. application Ser. No. 10/930,635, filed Aug. 31, 2004 now U.S. Pat. No. 7,080,521, the entire contents of which is hereby incorporated by reference.

BACKGROUND

The present invention relates to a mobile refrigeration system. More particularly, the present invention relates to an engine-driven mobile refrigeration system that includes an automatic control system.

Mobile refrigeration systems are often used to chill or cool a storage area within a mobile container, such as a truck trailer. Often, perishable items, such as fruits and vegetables, are transported using these systems. The shelf life and appearance of these products is greatly affected by the temperature at which they are maintained during shipping. For example, too low a temperature can cause freezing, which damages some of the products being shipped. Too high of a temperature may cause spoilage or rotting of some products that are shipped.

New trailers are getting larger and include less insulation. In addition, the insulation in old trailers degrades over time. Furthermore, trailers are commonly used across a wide ambient temperature range, thus requiring precise temperature control across a much wider capacity range. As such, current transport systems have difficulty maintain the temperature of the products within a narrow range without excess engine operation. The excess engine operation results in additional engine and other component wear, additional maintenance, and additional fuel costs.

SUMMARY

The present invention provides a mobile refrigeration system that includes an engine that is operable at a first speed greater than zero and a second speed greater than zero. A compressor is operable in response to the engine at a first speed and a second speed. The system also includes an evaporator, a first temperature sensor positioned to measure a first temperature, and a second temperature sensor positioned to measure a second temperature. A controller is operable to transition the engine between the first speed and the second speed in response to the first temperature exceeding a first predetermined value and the second temperature falling below a second predetermined value.

The invention also provides a mobile refrigeration system that includes an engine that is operable at a first speed and a second speed. A compressor is operable in response to operation of the engine to produce a flow of compressed refrigerant. A valve is associated with the compressor and is movable between a first position and a second position to vary the flow of compressed refrigerant. A fan is operable in response to operation of the engine to produce a flow of air. A first temperature sensor is positioned to measure a first temperature and a second temperature sensor is positioned to measure a second temperature. A timer is operable to time a duration and a microprocessor-based controller is operable to vary the valve position to maintain the first temperature at about a user set point. The controller is also operable to transition the engine between the first speed and the second speed in response to a measured first temperature in excess of a first predetermined value and the second measured temperature less than a second predetermined value and a timed duration greater than a predetermined time.

The invention also provides a method of controlling a mobile refrigeration unit. The method includes operating an engine at a first speed and operating a compressor at a first speed in response to engine operation to produce a flow of compressed refrigerant. The method further includes measuring a first temperature and moving a valve in response to the measured first temperature to maintain the first temperature at about a first user defined temperature. The method also includes measuring a second temperature and transitioning the engine to a second speed greater than the first speed in response to the measured second temperature. The method further includes moving the valve in response to the second temperature to maintain the second temperature at about a second user defined temperature.

BRIEF DESCRIPTION OF THE DRAWINGS

The description particularly refers to the accompanying figures in which.

Before any embodiments of the invention are explained, it is to be understood that the invention is not limited in its application to the details of construction and the arrangements of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof is meant to encompass the items listed thereafter and equivalence thereof as well as additional items. The terms "connected," "coupled," and "mounted" and variations thereof are used broadly and encompass direct and indirect connections, couplings, and mountings. In addition, the terms "connected" and "coupled" and variations thereof are not restricted to physical or mechanical connections or couplings.

DETAILED DESCRIPTION

Figure 1:
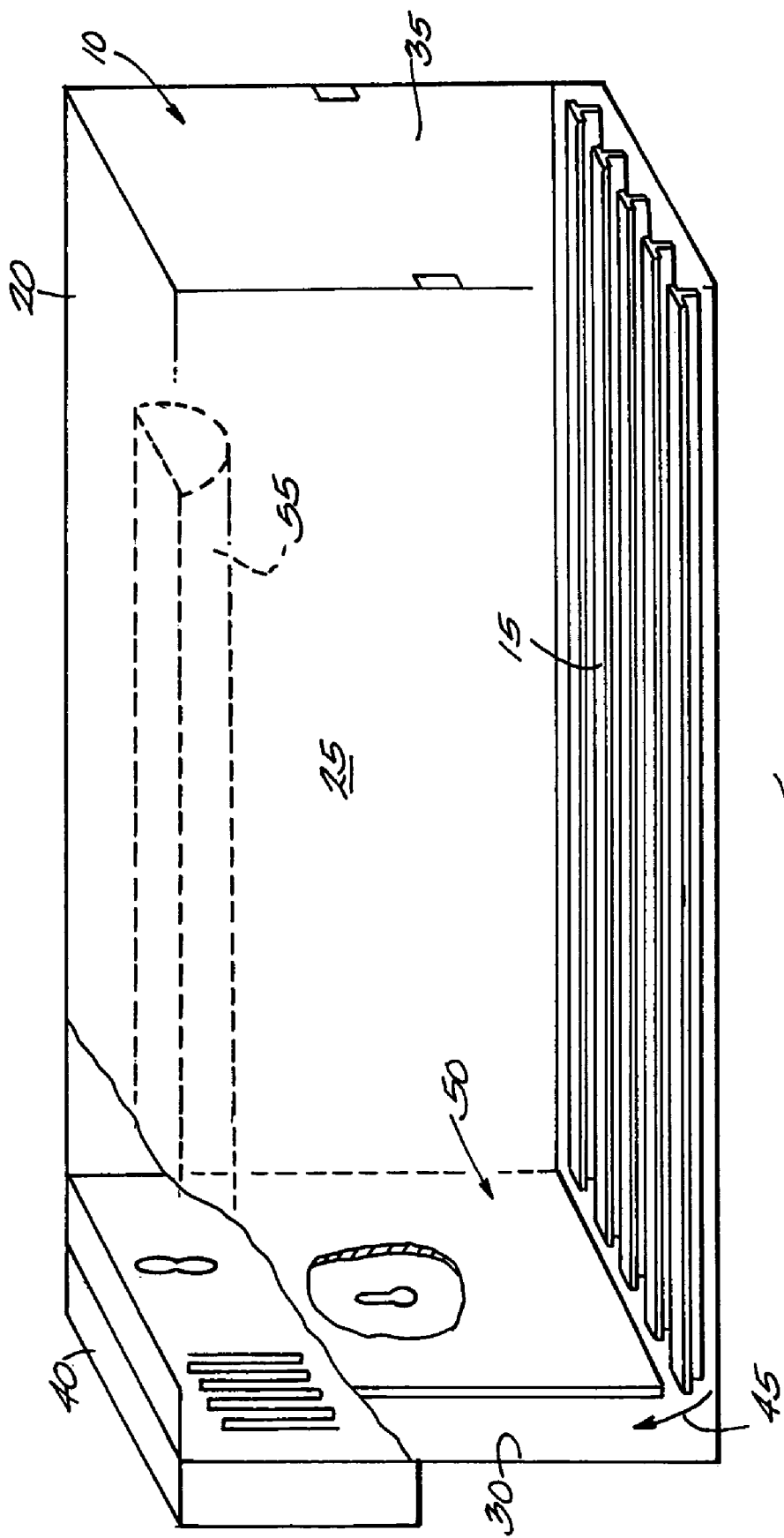
FIG. 1 is a schematic illustration of a mobile refrigeration compartment including a refrigeration system.

With reference to FIG. 1, a cargo space 10 such as would be found within a truck trailer is illustrated. The cargo space 10 includes a floor 15, a ceiling 20, two side walls 25, a front wall 30, and a rear wall 35. Generally, the rear wall 35 includes a door that allows for convenient loading and unloading of the cargo space 10. In most constructions, the walls 25, 30, 35 the floor 15, and the ceiling 20 are insulated to make temperature control of the cargo space 10 more efficient.

A refrigeration system 40 is attached to the outside of the front wall 30 with other locations being possible. The refrigeration system 40 draws relatively warm air from within the cargo space 10, cools the air, and returns the cold air to the cargo space 10. The front wall 30 of the cargo space 10 includes a return air aperture 45 that provides for the passage of air from the cargo space 10 into the refrigeration system 40. Generally, a bulkhead 50 that may include an air filter at least partially defines the aperture 45.

Cold air exiting the refrigeration system 40 is generally directed to an air delivery duct 55 disposed on the ceiling 20 of the cargo space 10. The air delivery duct 55 distributes the cold air substantially evenly throughout the cargo space 10 to assure that the entire cargo space 10 is evenly cooled.

Figure 2:
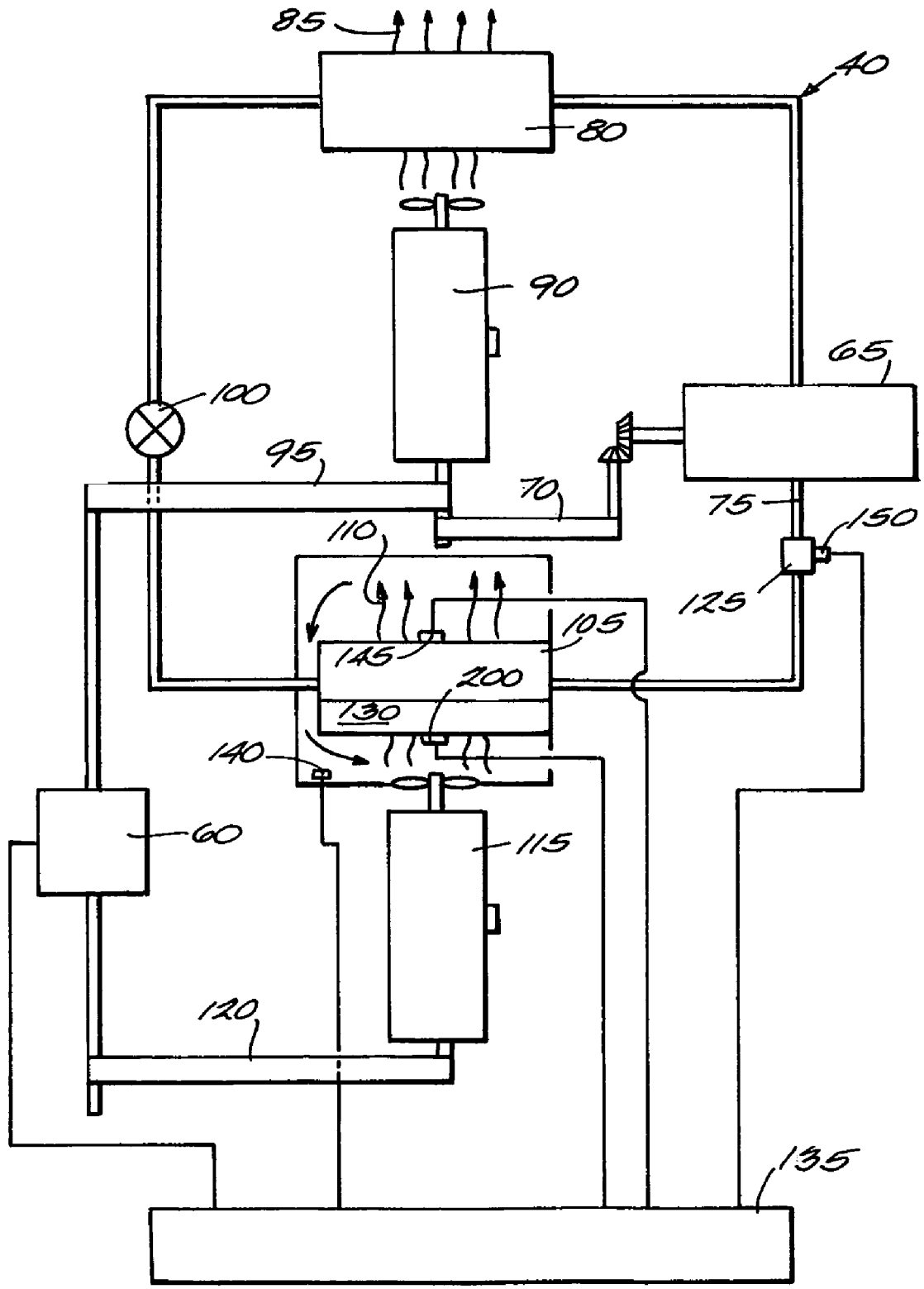
FIG. 2 is a schematic illustration of a refrigeration cycle.

With reference to FIG. 2 the components of the refrigeration system 40 are illustrated. Before describing the system 40, it should be noted that many components, including valves, sensors, tanks, manifolds, and the like have been omitted from the diagram for clarity.

The refrigeration system 40 includes a diesel engine 60 that functions as the prime mover for the system. In other constructions, other engines (e.g., gasoline, Stirling, combustion turbine, hybrid, and the like) may be used as the prime mover. The refrigeration system 40 also includes a compressor 65 that is driven by the engine 60 to produce a flow of compressed refrigerant (e.g., R12, freon, ammonia, etc.). The engine 60 drives the compressor 65 such that the compressor 65 operates at a speed that is proportional to the speed of the engine 60. In many constructions, a belt or chain drive 70 is employed to couple the engine 60 and the compressor 65. However, other constructions may employ a direct drive, a gear drive, or another type of coupling or transmission. Many types of compressors can be employed including, but not limited to, screw compressors, reciprocating compressors, and scroll compressors.

The compressor 65 draws refrigerant from a suction line 75 and compresses the refrigerant to produce a flow of compressed refrigerant. The compressed refrigerant flows to a condenser 80 where excess heat is removed. The condenser 80 includes a heat exchanger that transfers heat energy from the compressed refrigerant to an air stream 85. A condenser fan 90, driven by the engine 60, moves the air stream 85 through the condenser 80 to facilitate the efficient removal of heat. As with the compressor 65, preferred constructions employ a belt or chain drive 95 between the condenser fan 90 and the engine 60 that assures that the condenser fan 90 operates at a speed that is proportional to the speed of the engine 60. In other constructions, different coupling means such as gears, direct drives, or other types of transmissions may be employed to allow the engine 60 to drive the condenser fan 90.

As the flow of compressed refrigerant passes through the condenser 80, the refrigerant generally condenses to a liquid state. The high-pressure liquid next flows to an expansion valve 100 where the pressure is reduced, thereby also reducing the temperature of the refrigerant. The cold refrigerant then flows into an evaporator 105.

The evaporator 105 includes a second heat exchanger that transfers heat energy from a second air stream 110 that is drawn from the cargo space 10 to the refrigerant. Thus, the evaporator 105 cools the second air stream 110. As with the condenser 80, the evaporator 105 includes an evaporator fan 115 that is driven by the engine 60. The evaporator fan 115 moves the second air stream 110 through the evaporator 105 and back into the cargo space 10 to facilitate the efficient cooling of the air stream 110. As with the condenser fan 90, preferred constructions employ a belt or chain drive 120 between the evaporator fan 115 and the engine 60 that assures that the evaporator fan 115 operates at a speed that is proportional to the speed of the engine 60. In other constructions, different coupling means such as gears, direct drives, or other types of transmissions may be employed to allow the engine 60 to drive the evaporator fan 115.

After the refrigerant leaves the evaporator 105, it returns to the suction line 75 that feeds the compressor 65, thus completing the cycle. As one of ordinary skill in the art will realize, many other components may be employed in the system just described. For example, multiple compressors 65, evaporators 105, condensers 80, evaporator fans 115, or condenser fans 90 could be employed in one system if desired. In addition, storage tanks, reservoirs, liquid-to-suction heat exchangers, economizers, unloader valves, and hot-gas bypass valves could be employed at various points within the system.

With continued reference to FIG. 2, the refrigeration system 40 also includes a suction line throttle valve 125. The suction line throttle valve 125 moves between a first, or closed position and a second, or open position. In the closed position, the valve 125 restricts the quantity of refrigerant delivered to the compressor 65 and thus reduces the cooling capacity of the refrigeration system 40. As the valve 125 moves toward the open position, additional refrigerant is able to pass through the valve 125 to increase the cooling capacity of the refrigeration system 40. In most constructions, the valve 125 is electrically controlled and actuated. However, other constructions may employ other types of valves (e.g., mechanically controlled and actuated) if desired. Other constructions may also employ valves that are positioned differently than the suction line valve 125 (e.g., unloader valves) but that still function to control the cooling capacity of the refrigeration system 40 by varying the flow of refrigerant to or from the compressor 65.

In some constructions, a third heat exchanger 130 is positioned adjacent the evaporator 105 or actually intermingles with the evaporator 105. The third heat exchanger 130 receives a flow of heated fluid that can be used to defrost the evaporator 105. For example, one construction of the refrigeration system 40 directs engine coolant from the engine 60 through the third heat exchanger 130 to periodically defrost the evaporator 105.

The system 40 includes a controller 135 that is interconnected with the engine 60 and a plurality of sensors to monitor and control the refrigeration system 40. In preferred constructions, a microprocessor-based controller is employed. However, other constructions may employ an analog electric control system such as a series of switches and relays or another controller (e.g., mechanical control system, PLC based system, and the like) as desired. The use of the microprocessor-based controller allows for greater flexibility and more accurate control than what could be achieved using other types of controllers.

Among the many sensors that may be employed, the refrigeration system generally includes a return air sensor 140 that measures the temperature of the air returning from the cargo space 10. Generally, the return air temperature provides a good indication of the actual temperature of the product being shipped within the cargo space 10. Another sensor typically employed is a discharge air temperature sensor 145. The discharge air temperature sensor 145 measures the temperature of the air leaving the evaporator 105. Generally, this is the lowest air temperature within the system 40. In many systems 40, redundant sensors 140, 145 are provided such that the failure of one or more sensors does not disable the entire refrigeration system 40.

In most constructions, the refrigeration system 40 also includes a valve position sensor 150. The valve position sensor 150 measures the actual position of the valve 125 and returns a signal to the controller 135 that is representative of the actual valve position. While many different types of sensors or feedback are possible, LVDTs (linear variable differential transformers) and RVDTs (rotational variable differential transformers) are preferred. In other constructions, a stepper motor is used to drive the valve 125 and the position of the stepper motor is monitored using software, thus eliminating the need for position feedback.

The refrigeration system 40 described herein is capable of operating in several modes depending on the operating conditions of the system 40 as well as ambient conditions outside of the cargo space 10. In addition, the controller 135 is able to automatically transition the system 40 between the various modes.

Figure 3A:
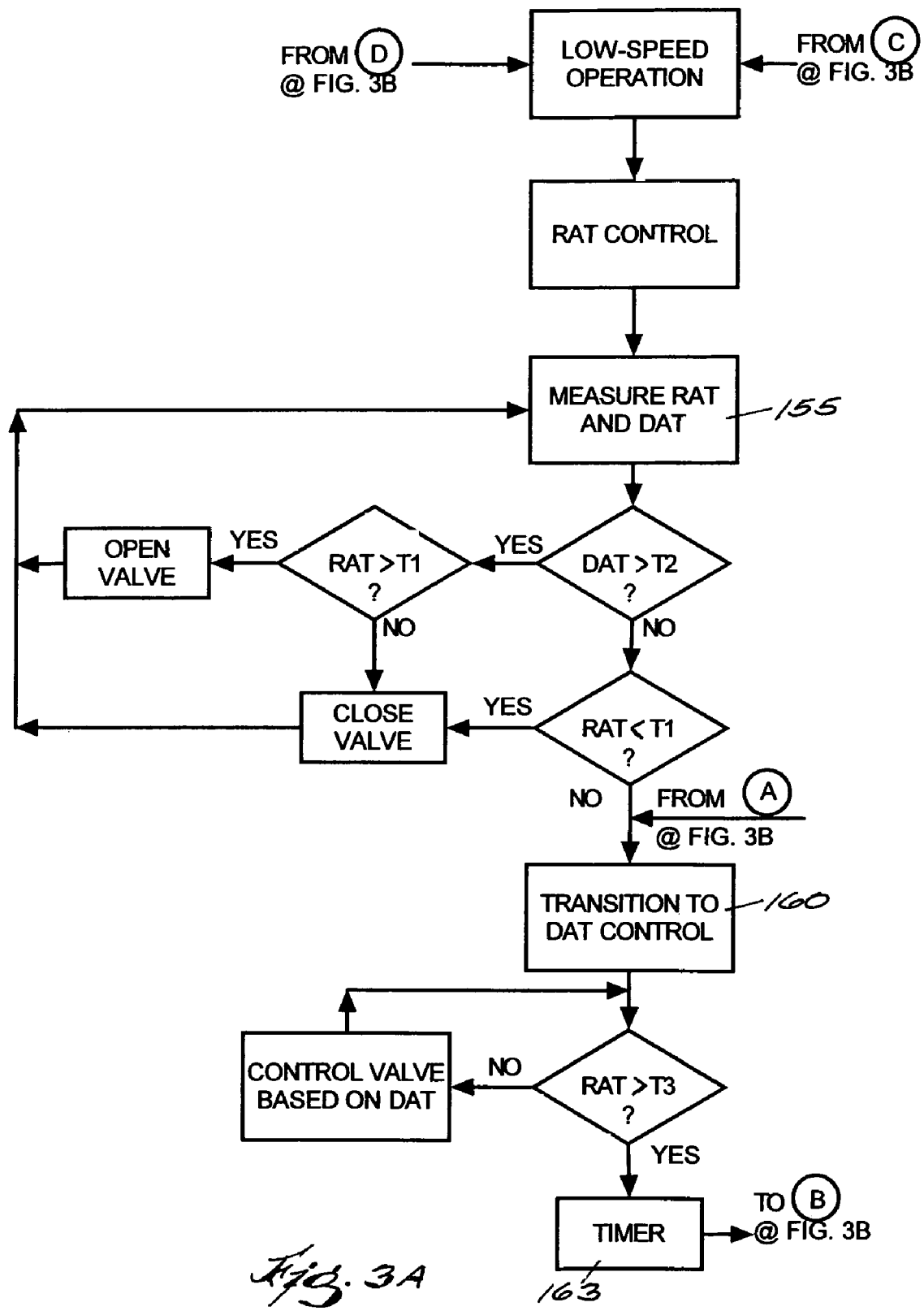
FIG. 3 is a simplified flowchart illustrating a portion of the operation of the refrigeration system of FIG. 1.
Figure 3B:
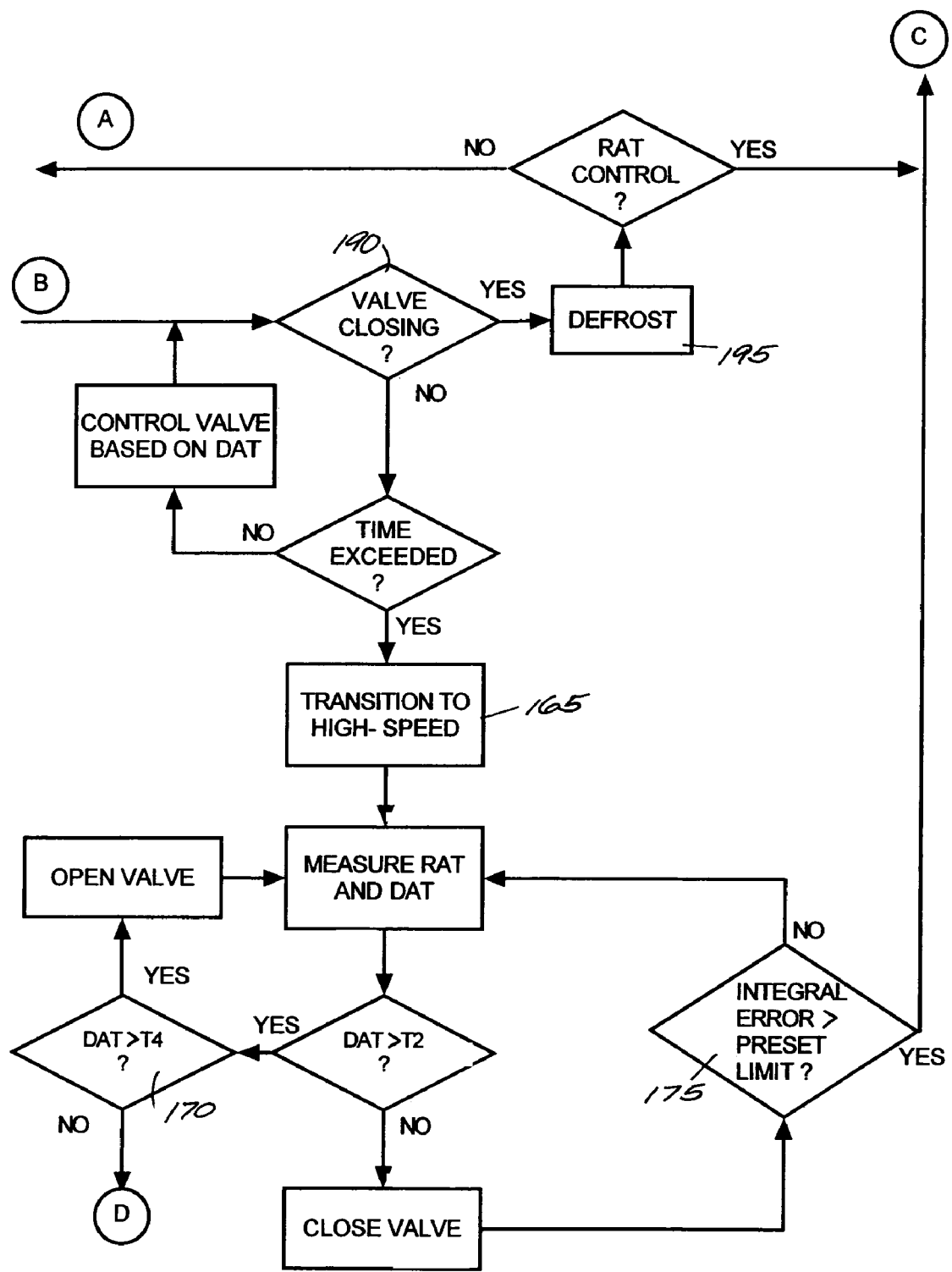

One mode of operation illustrated in FIG. 3 is return air control with modulation. In this mode, the controller 135 monitors the return air temperature (RAT) (shown in block 155) and manipulates the suction line throttle valve 125 in an effort to maintain the measured return air temperature at or near a user defined return air set point value T1. Generally, the user defined return air set point temperature T1 is between about 15 degrees and 90 degrees Fahrenheit. Of course, colder or warmer temperatures could be selected if desired. As the throttle valve 125 opens, more refrigerant is drawn into the compressor 65, thereby increasing the cooling capacity of the refrigeration system 40. However, the air flow through the evaporator 105 remains substantially constant as the evaporator fan 115 moves at a constant speed. Thus, the air exiting the evaporator 105 is cooler. This air temperature is measured (at block 155) as the discharge air temperature (DAT).

To further improve the control of the temperature within the cargo space 10, a lower limit is placed on the discharge air temperature when operating in return air control. This limit is generally referred to as the discharge air floor limit T2. The discharge air floor limit T2 is generally determined by subtracting a user input deltaT (ΔT) value from the user defined return air set point value T1. For example, if a user selects a return air set point T1 of 40 degrees Fahrenheit and further selects a deltaT value of 5 degrees Fahrenheit, the discharge air floor limit T2 would be 35 degrees Fahrenheit. In most constructions, a deltaT value between about 1 degree and 6 degrees Fahrenheit is preferred. However, other constructions may employ larger or smaller deltaT values.

If, during return air control operation, the discharge air temperature falls to the floor limit T2, the controller 135 automatically transitions the system 40 to discharge air temperature control (DAT Control) shown in block 160. When in discharge air temperature control, the controller 135 manipulates the suction line throttle valve 125 in an effort to maintain the discharge air temperature at the floor limit T2.

When controlling based on discharge air temperature, it is possible for the return air temperature, and the cargo temperature to continue to rise above the return air setpoint T1 due to many factors (e.g., high ambient temperature, warm product, product respiration, air infiltration, insulation degradation, evaporator airflow restrictions, and the like). The controller 135 monitors the return air temperature and compares this temperature to a maximum temperature set point T3. Generally, the maximum temperature set point T3 is simply an offset 161 from the return air set point temperature T1. For example, a particular load may have a return air set point T1 of 40 degrees Fahrenheit and an offset of 5 degrees Fahrenheit. For this load, the maximum temperature set point T3 would be 45 degrees Fahrenheit. If the return air temperature exceeds the maximum temperature set point T3 for a predetermined length of time (e.g., 30 minutes) as measured by a timer 163 or the controller 135, the system 40 automatically transitions to high-speed modulation (shown in block 165). In many constructions, the timer is built into software, thus allowing the controller to perform the function of the timer.

In high-speed modulation, the engine speed is increased. During normal operation the engine 60 operates at a first speed. The first speed provides enough power, airflow, and sufficient temperature control to operate the refrigeration system 40 under normal load conditions. However, under some load conditions additional power and airflow is required. Thus, the engine 60 is able to operate at a second speed that is higher than the first speed. At the second speed, the evaporator fan 115 and condenser fan 90 also operate at a higher speed. As such, both fans 90, 115 are able to push additional air through the respective heat exchangers 80, 105. Similarly, the compressor 65 operates at a higher speed, thereby enabling the compressor 65 to deliver a greater quantity of refrigerant if necessary.

During high-speed modulation, the controller 135 continues to manipulate the suction line throttle valve 125 to maintain the discharge air temperature at the floor limit T2. However, because additional air is moving through the evaporator 105, the system 40 is able to maintain a substantially constant cooling capacity, while reducing the temperature differential between the discharge air temperature and the return air temperature. The reduction in the temperature difference between the discharge air and the return air is a result of the additional mass flow of air exiting the evaporator 105 at the floor limit temperature T2, as compared to the mass flow when the engine 60 is operating at low speed. This additional air flow has the effect of reducing the return air temperature.

The system 40 includes two conditions that facilitate the return to low-speed modulation from high-speed modulation. If either of these conditions is met, the system 40 transitions back to low-speed operation. The first condition occurs when the return air temperature reaches a switch point T4 that is equal to the return air temperature set point T1 plus an offset 166 (see block 170). Generally, an offset 166 of between about 1 and 10 degrees Fahrenheit is employed with larger or smaller offsets being possible. For example, if the return air set point T1 is set at 40 degrees Fahrenheit and an offset 166 of 5 degrees Fahrenheit is employed, the switch point T4 would equal 45 degrees Fahrenheit.

Figure 5:
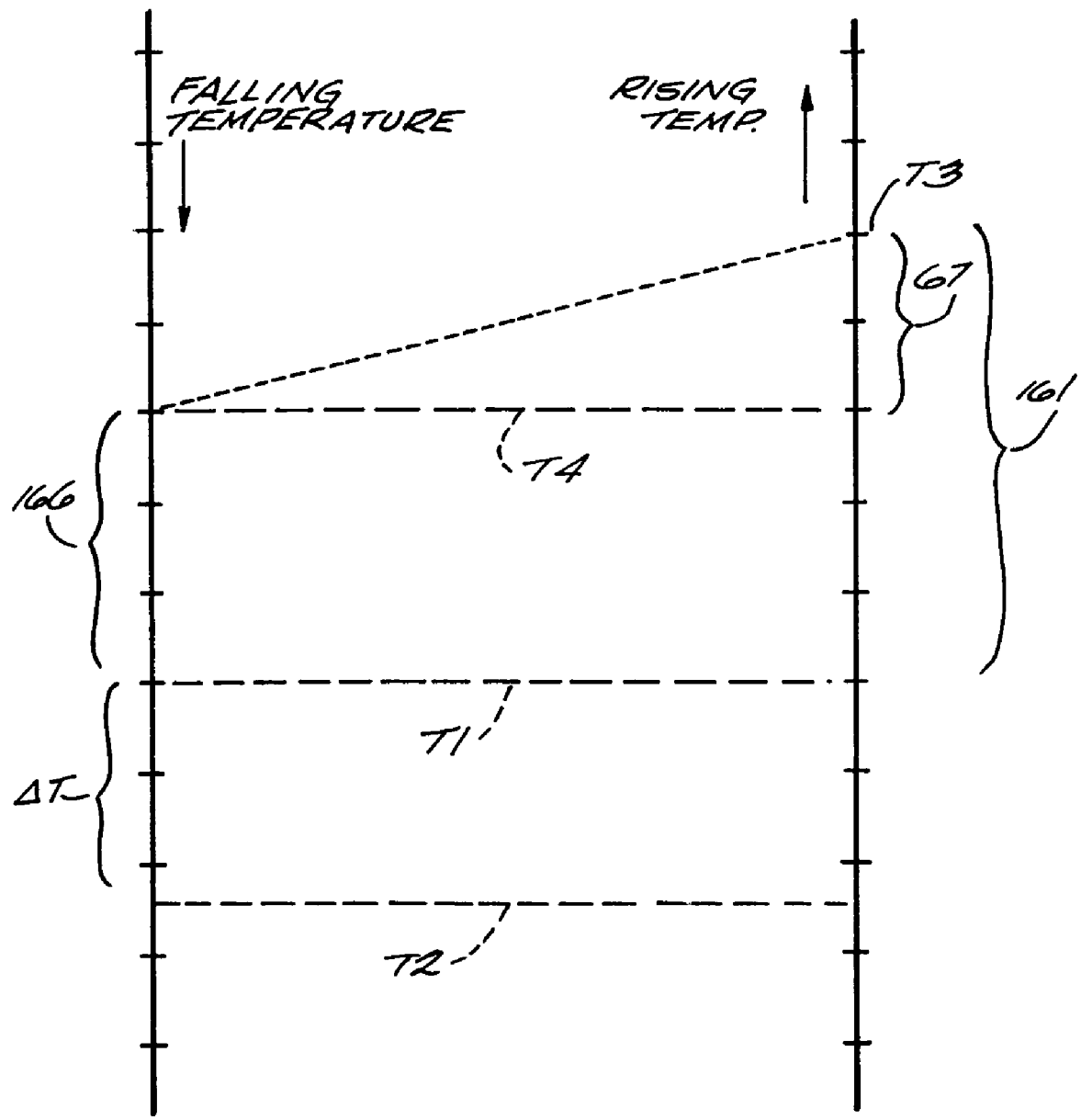
FIG. 5 is a ladder diagram illustrating various temperature relationships.

It should be noted that the maximum temperature set point T3 is generally offset a fixed amount 167 from the switch point T4. In most constructions, a 2-degree Fahrenheit offset is employed with larger or smaller offsets being possible. The 2-degree offset reduces the likelihood of sudden transitions between high and low speed in response to minor temperature fluctuations. The relationships between these various temperatures are best illustrated in FIG. 5.

The second condition is based on an integral error that accumulates within the controller (block 175). When the integral error reaches a maximum integral error value, the system transitions into low-speed modulation. The integral error accumulates based on the temperature difference between the measured return air temperature and a predetermined value (e.g., the return air temperature set point T1 plus an offset, such as 2 degrees Fahrenheit). However, unlike a typical integral error, the integral error accumulates more slowly the greater the temperature error. Thus, a condition that maintains a high temperature error (e.g., 10 degrees Fahrenheit) will take longer to reach the maximum integral error than would a condition that maintains a small temperature error (e.g., 2 degrees Fahrenheit). Thus, the integral error will allow the system 40 to operate at high-speed for a longer period of time if the temperature error is large, but will transition the system 40 back to low speed more quickly for small temperature differences. For example, a simple refrigeration system may sum the inverse of the actual error to calculate an integral error. In this example, a constant error of 2 degrees Fahrenheit would produce an error of 2 degree-minutes, per minute that the error is maintained. The inverse of this value would produce an integral error of 0.5 that would increase by 0.5 each minute. The same system, operating with a 10-degree temperature error would produce an integral error of 0.1 that would increase by 0.1 each minute. Thus, in this example it would take five times longer to reach a maximum integral error value with a 10 degree error than it does with a 2 degree error.

The integral error assures that the system 40 will eventually transition back to low speed operation no matter the temperatures being measured. This reduces the likelihood that the system 40 will operate at high speed for a long period of time when low-speed operation would be capable of handling the cooling load.

Figure 4:
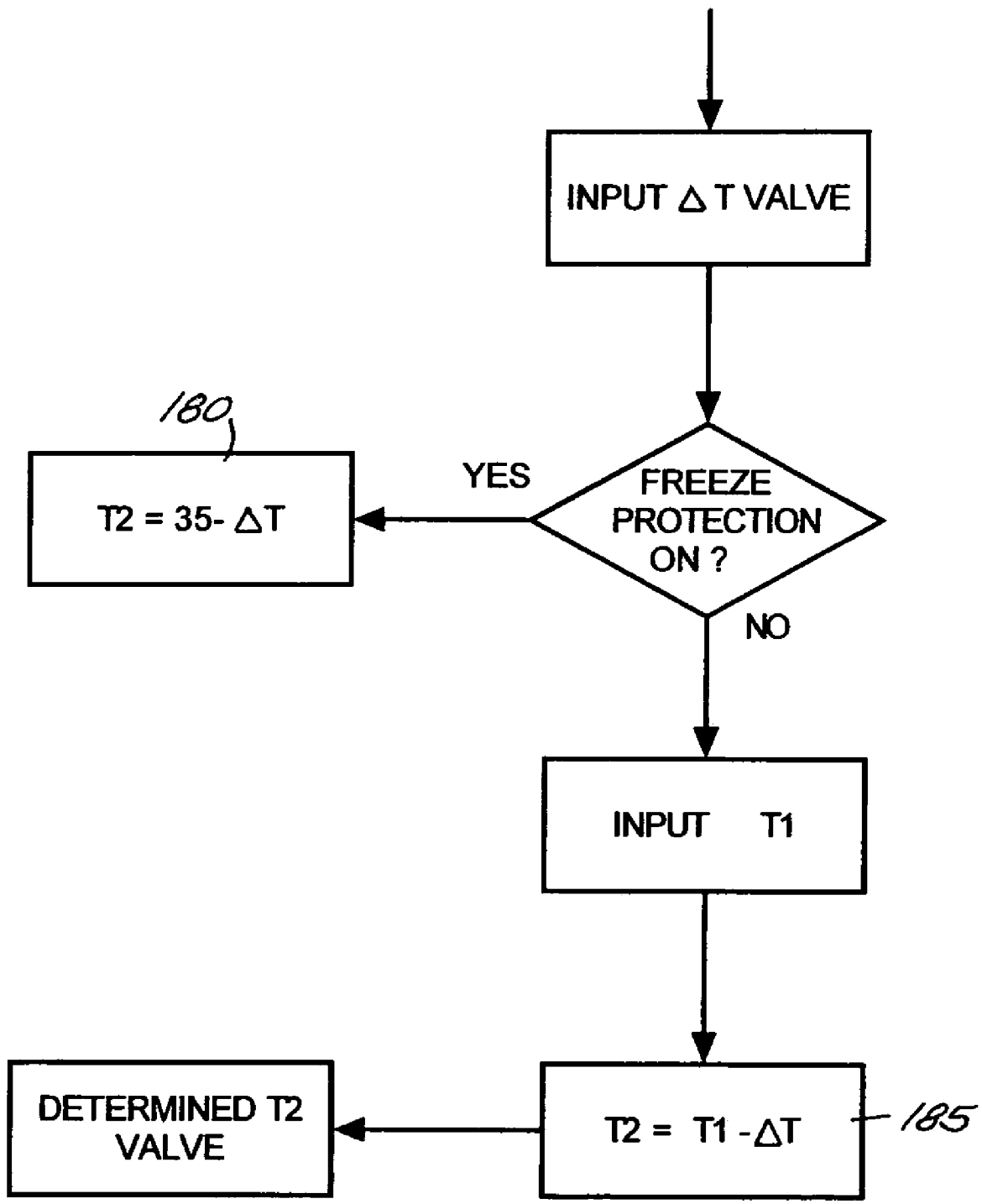
FIG. 4 is a flowchart illustrating a portion of the operation of the refrigeration system of FIG. 1.

Freeze protection, a portion of which is illustrated in FIG. 4, is yet another mode of operation of the refrigeration system 40. When operating in freeze protection, the floor limit T2 is calculated as an offset from a base level of 35 degrees Fahrenheit (block 180), rather than as an offset from the return air set point temperature T1 (block 185). Thus, the user input deltaT value is subtracted from 35 degrees Fahrenheit when operating in freeze protection mode. This mode is particularly well suited for use when the cargo space 10 contains high-temperature set point goods. For example, if the return air temperature set point T1 is 45 degrees Fahrenheit and the delta T value is 3 degrees, the floor limit would be 42 degrees Fahrenheit without using freeze protection. With freeze protection, the floor limit would be 32 degrees Fahrenheit (i.e., 35 degrees −3 degrees). The lower floor limit T2 in freeze protection mode allows the system 40 to remain in low-speed modulation during operating conditions that would otherwise require high-speed modulation. The reduced high-speed operation saves engine fuel and reduces engine wear.

It should be noted that the fixed value of 35 degrees Fahrenheit used in freeze protection could vary from system to system. As such, the invention should not be limited to a fixed value of 35 degrees Fahrenheit.

During operation of the refrigeration system 40, cold refrigerant flowing within the evaporator 105 will cool the evaporator 105. If the evaporator 105 cools below about 32 degrees Fahrenheit, water vapor within the air stream 110 will condense and freeze onto the evaporator 105. As this process continues, the air flow paths through the evaporator 105 will shrink due to the expanding quantity of ice. The reduced air flow through the evaporator 105 reduces the cooling capacity of the refrigeration system 40 but also reduces the discharge air temperature. When operating in modulation with return air control, the reduced air flow caused by the ice build-up will result in a rise in return air temperature. Simultaneously, the reduced air flow paths will produce a drop in discharge air temperature. At some point, these temperature changes will transition the system 40 into discharge air control. Once in discharge air control, the controller 135 will manipulate the suction line throttle valve 125 to maintain the discharge air temperature at the floor limit T2. However, as the air flow path continues to shrink, the discharge air temperature will continue to drop. The continued drop will cause the controller 135 to move the suction line throttle valve 125 to a more closed position even as the return air temperature rises. It is this combination of a reduction in discharge air temperature coupled with an increase in return air temperature and the movement of the suction line throttle valve 125 toward the closed position (block 190 in FIG. 3) that signals the need for a defrost cycle (block 195). The controller 135 senses these conditions and initiates the defrost cycle. Most systems also include an evaporator coil temperature sensor 200 that can also be used to indicate the need for a defrost cycle and the end of the defrost cycle. As discussed, there are various ways to defrost an evaporator 105 (e.g., passing hot engine coolant or refrigerant through the third heat exchanger 130, electric heat, etc.), the particular system or method used is not important to the invention described herein.

After the defrost cycle is complete, the controller 135 transitions the system 40 to one of the low-speed modulating control modes (e.g., return air control or discharge air control).

The refrigeration system 40 described is able to maintain the temperature within the cargo space 10 within a narrow temperature band that is selected by the user, while also reducing the operating time of the engine 60 at high speed. The result is a system that requires less maintenance than prior systems and that is more fuel-efficient. In addition, the improved temperature control results in improved quality of the product being shipped.

It should be noted that many systems may include an electric motor that serves as a back-up to the engine. In most constructions, a single-speed electric motor is used. However, other constructions may employ a two-speed or variable speed motor if desired.

High speed modulation gives the user the ability to control both the discharge air temperature (i.e., the floor limit) and the maximum return air temperature at the same time. Prior systems could only regulate one temperature. Furthermore, the temperature control can be customized for the particular load by the selection of various set points and temperature differentials. This allows the user to balance the temperature requirements with the amount of high-speed runtime. Thus, a user could select a wider temperature band to reduce the amount of high-speed operation and the amount of fuel consumed if desired. The control as described is able to provide consistent temperature control regardless of the product hauled, the operating conditions, or the trailer condition.

Although the invention has been described in detail with reference to certain preferred embodiments, variations and modifications exist within the scope and spirit of the invention as described and defined in the following claims.

What is claimed is:

1. A method of controlling a mobile refrigeration unit comprising:

operating an engine at a first speed;

operating a compressor at a first speed in response to engine operation to produce a flow of compressed refrigerant;

measuring a first temperature;

moving a valve in response to the first temperature to maintain the first temperature at about a first user defined temperature;

measuring a second temperature;

transitioning the engine to a second speed greater than the first speed in response to the measured second temperature; and moving the valve in response to the second temperature to maintain the second temperature at about a second user defined temperature.

2. The method of claim 1, wherein the engine includes a diesel engine.

3. The method of claim 1, wherein the first temperature is a return air temperature.

4. The method of claim 1, wherein the second temperature is a discharge air temperature.

5. The method of claim 1, wherein the transitioning step includes:
comparing the first temperature to a user defined maximum temperature;
calculating a duration that the first temperature remains above the user defined maximum temperature; and
transitioning the engine speed when the first temperature remains above the user defined maximum temperature for a duration that is greater than a user defined time period.

6. The method of claim 1, further comprising calculating the maximum temperature by adding an offset value to the first user defined temperature.

7. The method of claim 1, further comprising controlling the valve position to maintain the second temperature at a user defined floor limit when the second temperature falls at or below the floor limit.

8. The method of claim 7, further comprising calculating the user defined floor limit by subtracting a user defined deltaT from the first user defined temperature.

9. The method of claim 8, wherein the user defined deltaT is between about 1 degree and 6 degrees Fahrenheit.

10. The method of claim 7, further comprising calculating the user defined floor limit by subtracting a user defined deltaT from a fixed predetermined value.

11. The method of claim 10, wherein the fixed predetermined value is about 35 degrees Fahrenheit and the user defined deltaT is between about 1 degree and 6 degrees Fahrenheit.

12. The method of claim 1, further comprising initiating a defrost cycle in response to a first air temperature in excess of a predetermined value, a second air temperature at or below a predetermined value, and movement of the valve toward a position that reduces a flow of refrigerant.

13. The method of claim 1, further comprising positioning an evaporator adjacent a cooled space and positioning a defrost member adjacent the evaporator.

14. The method of claim 13, wherein the defrost member includes a defrost heat exchanger.

15. The method of claim 14, wherein the controller directs a flow of fluid to the defrost heat exchanger in response to the measured first temperature exceeding a value, the measured second temperature falling below a second value, and movement of the valve toward a position that reduces a flow of refrigerant.

16. The method of claim 1, further comprising transitioning the engine from the second speed to the first speed in response to one of the first measured temperature falling below a switch point value, and a summation of an integral error exceeding a predetermined maximum integral error.

17. The mobile refrigeration system of claim 16, wherein the integral error is inversely proportional to a temperature error.

* * * * *